(12) United States Patent
Hsieh

(10) Patent No.: US 10,126,841 B2
(45) Date of Patent: Nov. 13, 2018

(54) INTERACTIVE SYSTEM CAPABLE OF SWITCHING DIFFERENT WRITING MODES AND HANDHELD MEMBER THEREOF

(71) Applicant: BENQ CORPORATION, Taipei (TW)

(72) Inventor: Chia-Wei Hsieh, Taipei (TW)

(73) Assignee: BenQ Corporation, Taipei (TW)

( * ) Notice: Subject to any disclaimer, the term of this patent is extended or adjusted under 35 U.S.C. 154(b) by 11 days.

(21) Appl. No.: 15/194,582

(22) Filed: Jun. 28, 2016

(65) Prior Publication Data

US 2017/0205905 A1   Jul. 20, 2017

(30) Foreign Application Priority Data

Jan. 14, 2016   (TW) ............................. 105101063 A

(51) Int. Cl.
*G06F 3/0354* (2013.01)
*G06F 3/038* (2013.01)
*G06F 3/0488* (2013.01)
*H04B 5/00* (2006.01)

(52) U.S. Cl.
CPC ........ *G06F 3/03545* (2013.01); *G06F 3/0383* (2013.01); *G06F 3/04883* (2013.01); *H04B 5/0031* (2013.01)

(58) Field of Classification Search
CPC ...... G06F 3/0317; G06F 3/0321; G06F 3/033; G06F 3/03542; G06F 3/03545–3/03546; G06F 3/037; G06F 3/0386
See application file for complete search history.

(56) References Cited

U.S. PATENT DOCUMENTS

| | | | | |
|---|---|---|---|---|
| 2009/0135149 A1* | 5/2009 | Taniuchi | ............ | G06F 3/04845 345/173 |
| 2011/0250002 A1 | 10/2011 | Vora | | |
| 2013/0176252 A1 | 7/2013 | Fröjdh | | |
| 2013/0196596 A1 | 8/2013 | Parekh | | |
| 2014/0002422 A1* | 1/2014 | Stern | ................... | G06F 3/03545 345/179 |
| 2014/0049513 A1* | 2/2014 | Huang | .................... | G06F 3/041 345/174 |
| 2015/0002480 A1* | 1/2015 | Chen | ................... | G06F 3/03545 345/179 |
| 2016/0139690 A1* | 5/2016 | Chang | .................. | G06F 3/0383 345/179 |
| 2017/0108954 A1* | 4/2017 | Tang | ................... | G06F 3/03545 |

FOREIGN PATENT DOCUMENTS

| CN | 102156838 A | 8/2011 |
|---|---|---|
| CN | 204595798 U | 8/2015 |
| TW | M442550 U1 | 12/2012 |

* cited by examiner

*Primary Examiner* — Gene W Lee

(57) ABSTRACT

An interactive system includes a handheld member and a display module. The handheld member has a first near field communication tag and a second near field communication tag. The first near field communication tag generates a first near field signal, and the second near field communication tag generates a second near field signal. The display module includes a near field sensing unit and a control unit. The near field sensing unit is for sensing the first near field signal or the second near field signal. The control unit is coupled to the near field sensing unit and selectively performs a first function when the near field sensing unit senses the first near field signal or performs a second function when the near field sensing unit senses the second near field signal.

12 Claims, 12 Drawing Sheets

INTERACTIVE SYSTEM CAPABLE OF SWITCHING DIFFERENT WRITING MODES AND HANDHELD MEMBER THEREOF

BACKGROUND OF THE INVENTION

1. Field of the Invention

The present invention relates to an interactive system and a handheld member thereof, and more particularly, to an interactive system capable of switching different writing modes and a handheld member thereof.

2. Description of the Prior Art

With the development of touch control industry, an interactive tablet computer equipped with touch panel has been widely used in people's daily life. The interactive tablet computer is able to perform an application program for providing a user with a handwriting input window, such that the user utilizes a stylus pen to execute touch control operation within the handwriting input window. Furthermore, the application program is implemented with multiple configurations of handwriting, such as colors, widths or different types of fonts, for the user, so as to provide the user with variety of handwritings. However, which one of the aforesaid configurations of handwriting to execute within the window is manually selected by the user, which results in inconvenience in operation.

SUMMARY OF THE INVENTION

The present invention provides an interactive system capable of switching different writing modes and a handheld member thereof for solving above drawbacks.

According to an embodiment of the present invention, an interactive system capable of switching different writing modes is disclosed. The interactive system includes a handheld member and a display module. The handheld member includes a first near field communication tag and a second near field communication tag. The first near field communication tag generates a first near field signal, and the second near field communication tag generates a second near field signal. The display module includes a near field sensing unit and a control unit. The near field sensing unit is for sensing the first near field signal or the second near field signal. The control unit is coupled to the near field sensing unit. The control unit performs a first function when the near field sensing unit senses the first near field signal, and the control unit performs a second function when the near field sensing unit senses the second near field signal.

According to an embodiment of the present invention, a handheld member adapted for a display module is disclosed. The display module includes a near field sensing unit and a control unit coupled to the near field sensing unit. The handheld member includes a first near field communication tag and a second near field communication tag. The first near field communication tag is for activating the near field sensing unit to perform a first function. The second near field communication tag is for activating the near field sensing unit to perform a second function.

In summary, the handheld member of the present invention has the first near field communication tag generating the first near field signal and the second near field communication tag generating the second near field signal, and the display module has the near field sensing unit for sensing the first near field signal or the second near field signal. When the handheld member with the first near field communication tag approaches the near field sensing unit of the display module, the control unit of the display module performs the first function, such as executing a first handwriting mode of an application program. When the handheld member with the second near field communication tag approaches the near field sensing unit of the display module, the control unit of the display module performs the second function, such as executing a second handwriting mode of the application program. In such a manner, the present invention utilizes the handheld member with different near field communication tags to activate different handwriting modes of the display module, so as to enhance convenience of the interactive system in operation.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention maybe practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity.

It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
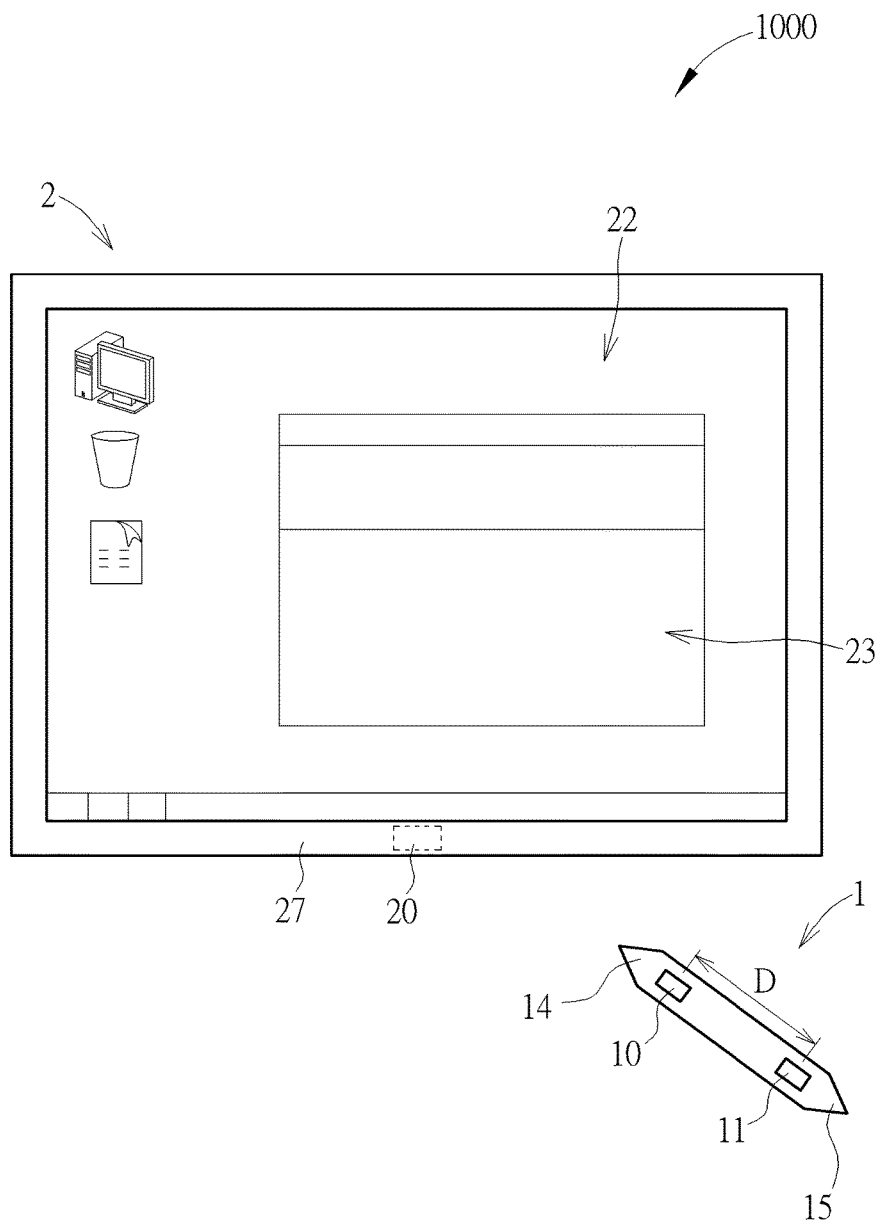
FIG. 1 is a diagram of an interactive system according to an embodiment of the present invention.
Figure 2:
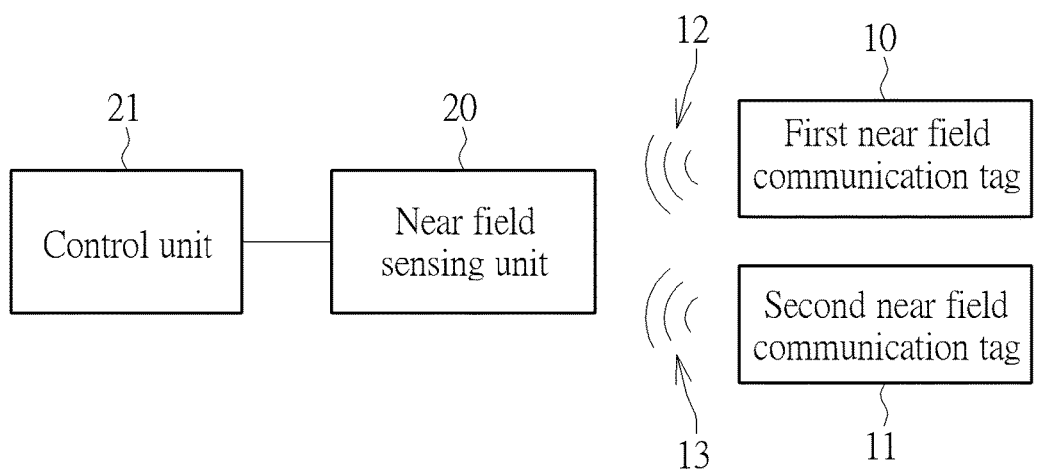
FIG. 2 is a functional block diagram of the interactive system according to the embodiment of the present invention.

Please refer to FIG. 1 and FIG. 2. FIG. 1 is a diagram of an interactive system 1000 according to an embodiment of the present invention. FIG. 2 is a functional block diagram of the interactive system 1000 according to the embodiment of the present invention. As shown in FIG. 1 and FIG. 2, the interactive system 1000 includes a handheld member 1 and a display module 2. The handheld member 1 includes a first near filed communication tag 10 and a second near field communication tag 11. The first near filed communication tag 10 generates a first near field signal 12, and the second near field communication tag 11 generates a second near field signal 13. The first near filed communication tag 10 and the second near field communication tag 11 generate the first near field signal 12 and the second near field signal 13 by Near Field Communication (NFC) technology.

It should be noticed that NFC is short range Radio Frequency Identification (RFID) wireless communication technology with bidirectional recognition and point to point transmission function, and the current NFC, but the present invention is not limited thereto. For example, the first near filed communication tag 10 and the second near field communication tag 11 can generate the first near field signal 12 and the second near field signal 13 by conventional RFID technology, i.e., the first near filed communication tag 10 and the second near field communication tag 11 adopt technology with capability of short range and non-contact transmission are within the scope of the present invention. As for which one of the above-mentioned designs is adopted, it depends on practical demands. The display module 2 includes a near field sensing unit 20 and a control unit 21. The near field sensing unit 20 is for sensing the first near field signal 12 or the second near field signal 13, and the control unit 21 is coupled to the near field sensing unit 20.

In this embodiment, the handheld member 1 is a pen-shaped member, and the pen-shaped member (i.e., the handheld member 1) has a first end portion 14 and a second end portion 15 opposite to the first end portion 14, wherein the first near filedcommunication tag 10 is coupled with the first end portion 14, and the second near field communication tag 11 is coupled with the second end portion 15. The configuration of the first near filed communication tag 10 and the second near field communication tag 11 relative to the pen-shaped member is not limited to those illustrated in figures in this embodiment, and it depends on practical demands. In this embodiment, the display module 2 is an interactive touch panel module including a touch control user interface 22 and a bezel 27 surrounding the touch control user interface 22. The near field sensing unit 20 is disposed on the bezel 27 and separated from the touch control user interface 22. The control unit 21 is further for performing an application program, and the application program is able to provide the user with different handwriting modes. When the control unit 21 performs the application program, the control unit 21 further controls the touch control user interface 22 shows a window 23 of the application program, such that the pen-shaped member is utilized in corporation of the window 23 to generate words with respect to the handwriting mode within the window 23. In practical application, the control unit 21 can include a program executing module for executing and performing the application program and an imaging display module for displaying the window 23.

Furthermore, the control unit 21 performs a first function when the near field sensing unit 20 senses the first near field signal 12, or alternatively, the control unit 21 performs a second function when the near field sensing unit 20 senses the second near field signal 13. In other words, the first near filed communication tag 10 of the handheld member 1 is for activating the near field sensing unit 20 to make the control unit 21 perform the first function, and the second near field communication tag 11 of the handheld member 1 is for activating the near field sensing unit 20 to make the control unit 21 perform the second function.

Figure 3:
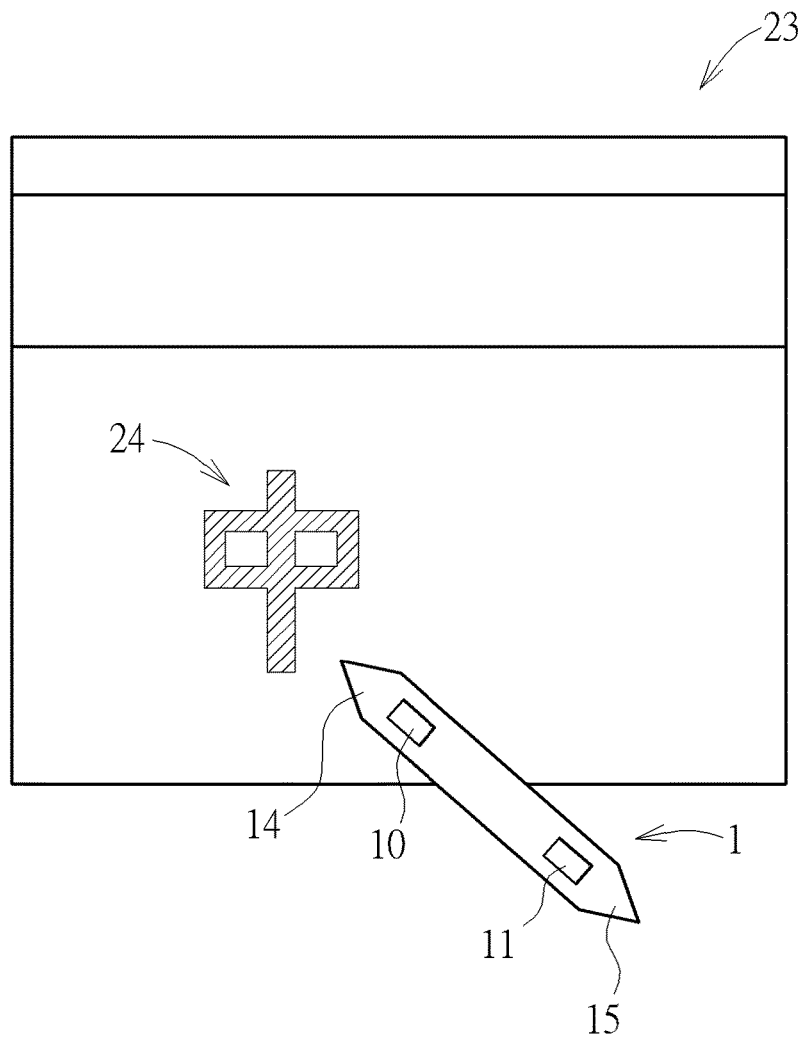
FIG. 3 is a diagram illustrating that a handheld member generates a first handwriting mode within a window according to the embodiment of the present invention.
Figure 4:
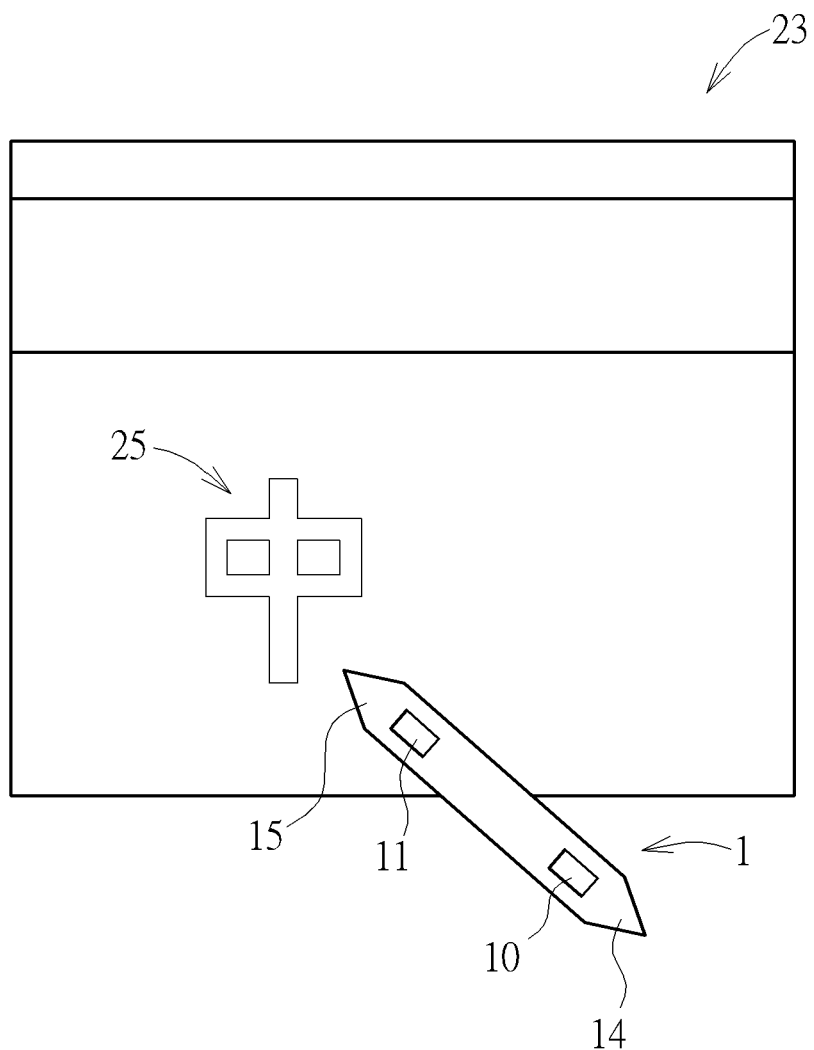
FIG. 4 is a diagram illustrating that the handheld member generates a second handwriting mode within the window according to the embodiment of the present invention.

For example, please refer to FIG. 1 to FIG. 4. FIG. 3 is a diagram illustrating that the handheld member 1 generates a first handwriting mode within the window 23 according to the embodiment of the present invention. FIG. 4 is a diagram illustrating that the handheld member 1 generates a second handwriting mode within the window 23 according to the embodiment of the present invention. As shown in FIG. 1 to FIG. 4, when the control unit 21 performs the application program, the touch control user interface 22 shows the window 23 which is generated by the application program. Furthermore, when the handheld member 1 with the first near filed communication tag 10 approaches the display module 2 until the near field sensing unit 20 senses the first near field signal 12, the control unit 21 performs the first function executing the first handwriting mode of the application program. In other words, when the near field sensing unit 20 senses the first near field signal 12, the first function performed by the control unit 21 is to execute the first handwriting mode of the application program. In this embodiment, when the control unit 21 performs the application program, the first near filed communication tag 10 activates the near field sensing unit 20, such that the control unit 21 performs the first function executing the first handwriting mode of the application program.

When the handheld member 1 with the second near field communication tag 11 approaches the display module 2 until the near field sensing unit 20 senses the second near field signal 13, the control unit 21 performs the second function executing the second handwriting mode of the application program. In other words, when the near field sensing unit 20 senses the second near field signal 13, the second function performed by the control unit 21 is to execute the second handwriting mode of the application program. In this embodiment, when the control unit 21 performs the application program, the second near field communication tag 11 activates the near field sensing unit 20, such that the control unit 21 performs the second function executing the second handwriting mode of the application program.

As shown in FIG. 3 and FIG. 4, when the control unit 21 executes the first handwriting mode, the first end portion 14 of the handheld member 1 is utilized for generating a first handwriting 24 within the window 23 which is generated by the application program. When the control unit 21 executes the second handwriting mode, the second end portion 15 of the handheld member 1 is utilized for generating a second handwriting 25 within the window 23 which is generated by the application program. A color of the first handwriting 24 is different from a color of the second handwriting 25. In this embodiment, the color of the first handwriting 24 is red, and the color of the second handwriting 25 is green, but the present invention is not limited thereto.

Figure 5:
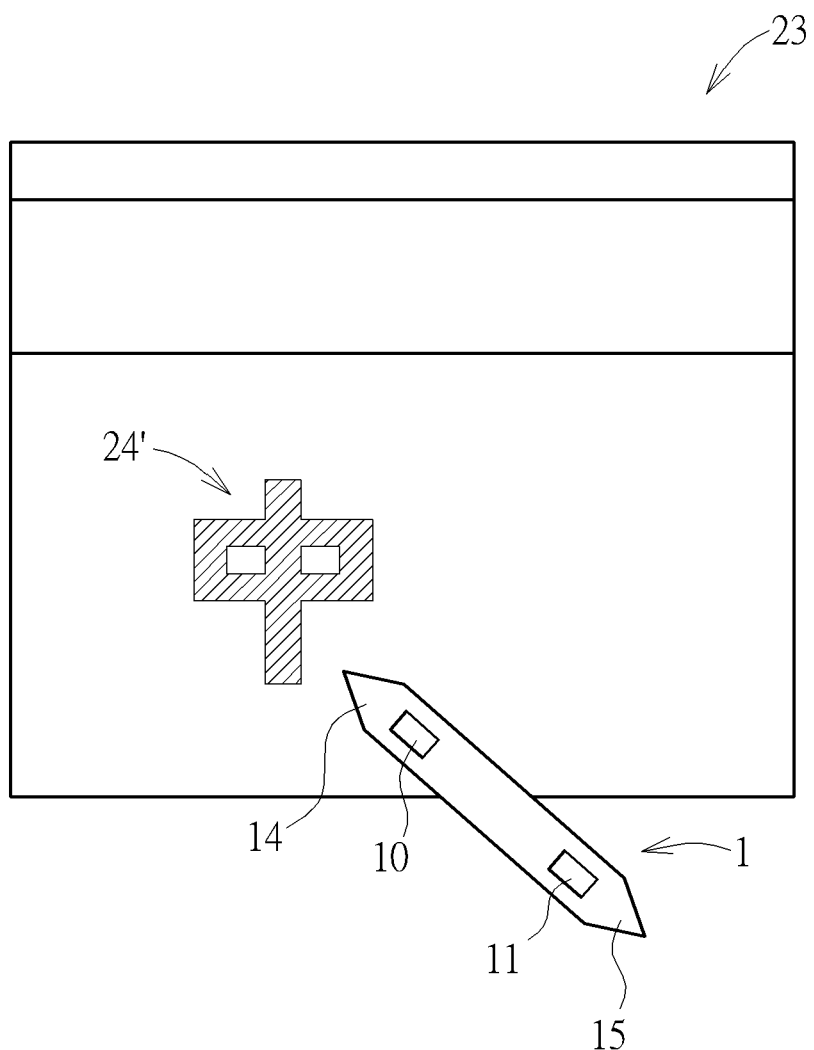
FIG. 5 is a diagram illustrating that the handheld member generates a first handwriting mode within the window according to another embodiment of the present invention.
Figure 6:
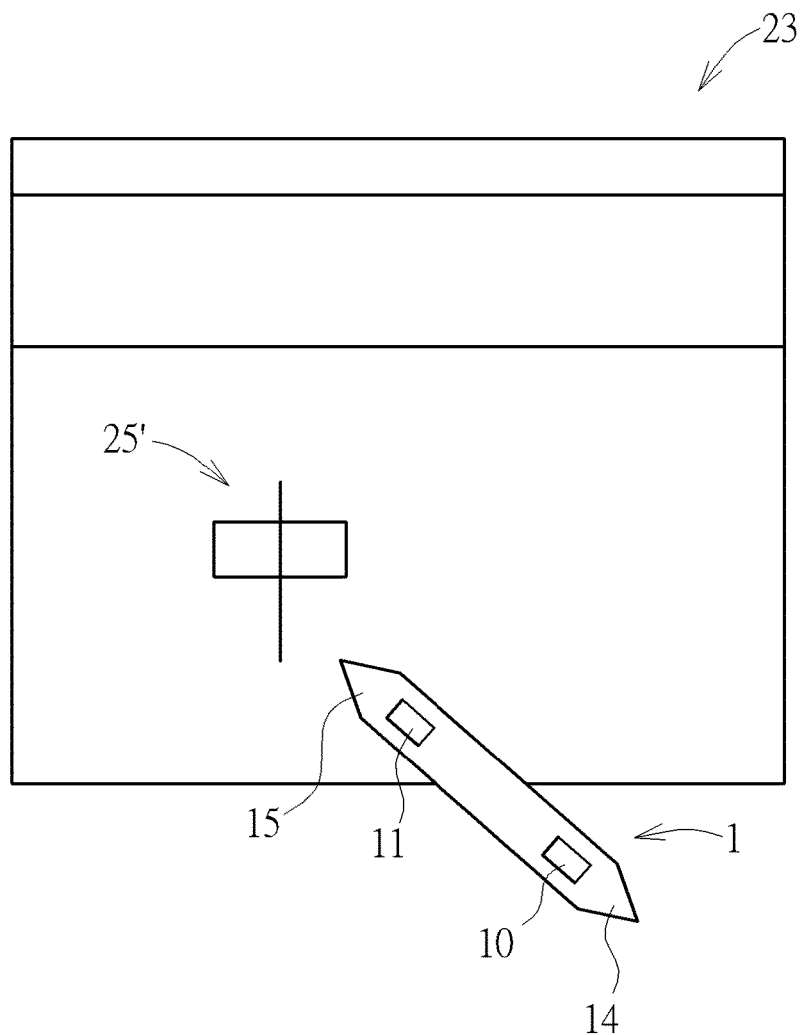
FIG. 6 is a diagram illustrating that the handheld member generates a second handwriting mode within the window according to another embodiment of the present invention.

Please refer to FIG. 5 and FIG. 6. FIG. 5 is a diagram illustrating that the handheld member 1 generates a first handwriting mode within the window 23 according to another embodiment of the present invention. FIG. 6 is a diagram illustrating that the handheld member 1 generates a second handwriting mode within the window 23 according to another embodiment of the present invention. As shown in FIG. 5 and FIG. 6, when the control unit 21 executes the first handwriting mode, the first end portion 14 of the handheld member 1 generates a first handwriting 24' within the window 23 which is generated by the application program. When the control unit 21 executes the second handwriting mode, the second end portion 15 of the handheld member 1 generates a second handwriting 25' within the window 23 which is generated by the application program. A width of the first handwriting 24' is greater than a width of the second handwriting 25'.

Figure 7:
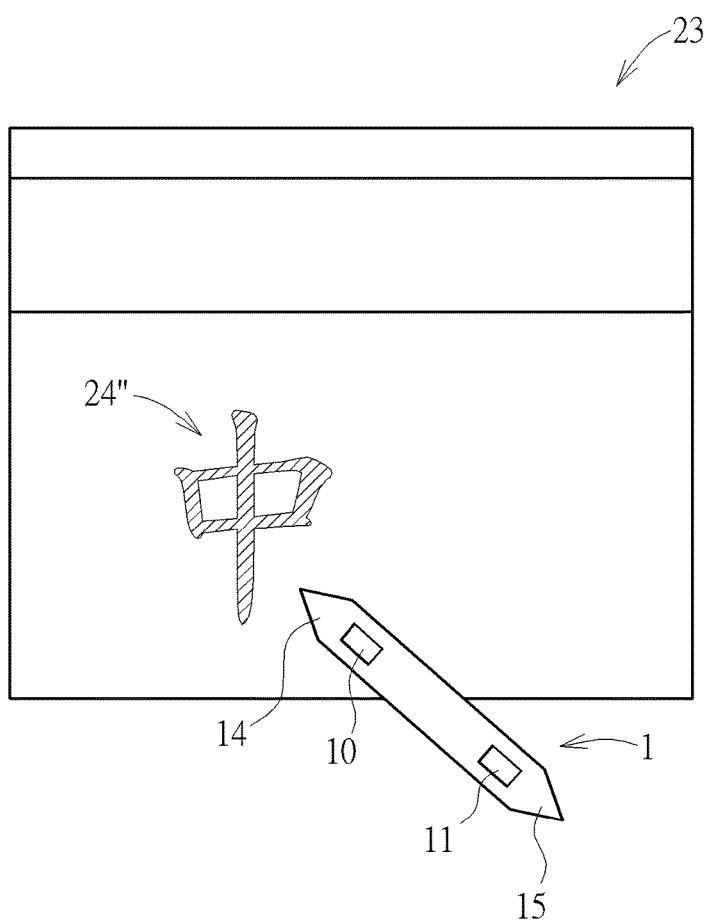
FIG. 7 is a diagram illustrating that the handheld member generates a first handwriting mode within the window according to another embodiment of the present invention.
Figure 8:
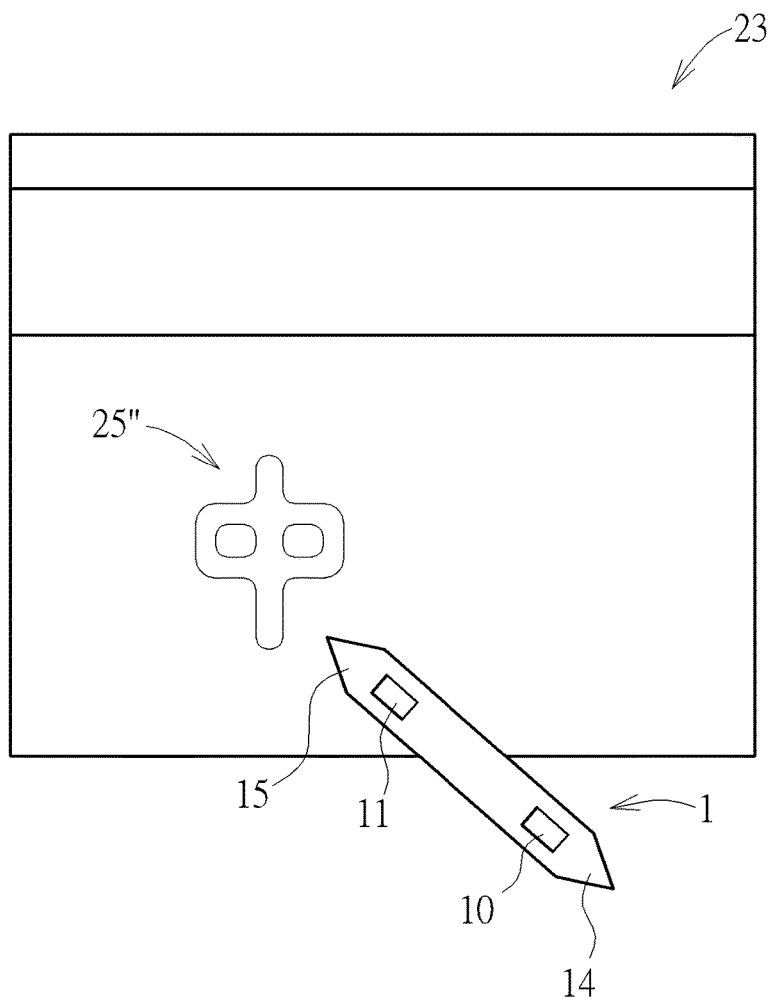
FIG. 8 is a diagram illustrating that the handheld member generates a second handwriting mode within the window according to another embodiment of the present invention.

Please refer to FIG. 7 and FIG. 8. FIG. 7 is a diagram illustrating that the handheld member 1 generates a first handwriting mode within the window 23 according to another embodiment of the present invention. FIG. 8 is a diagram illustrating that the handheld member 1 generates a second handwriting mode within the window 23 according to another embodiment of the present invention. As shown in FIG. 7 and FIG. 8, when the control unit 21 executes the first handwriting mode, the first end portion 14 of the handheld member 1 generates a first handwriting 24" within the window 23 which is generated by the application program. When the control unit 21 executes the second handwriting mode, the second end portion 15 of the handheld member 1 generates a second handwriting 25" within the window 23 which is generated by the application program. The first handwriting 24" is in writing brush font, and the second handwriting 25" is in highlighter font.

Figure 9:
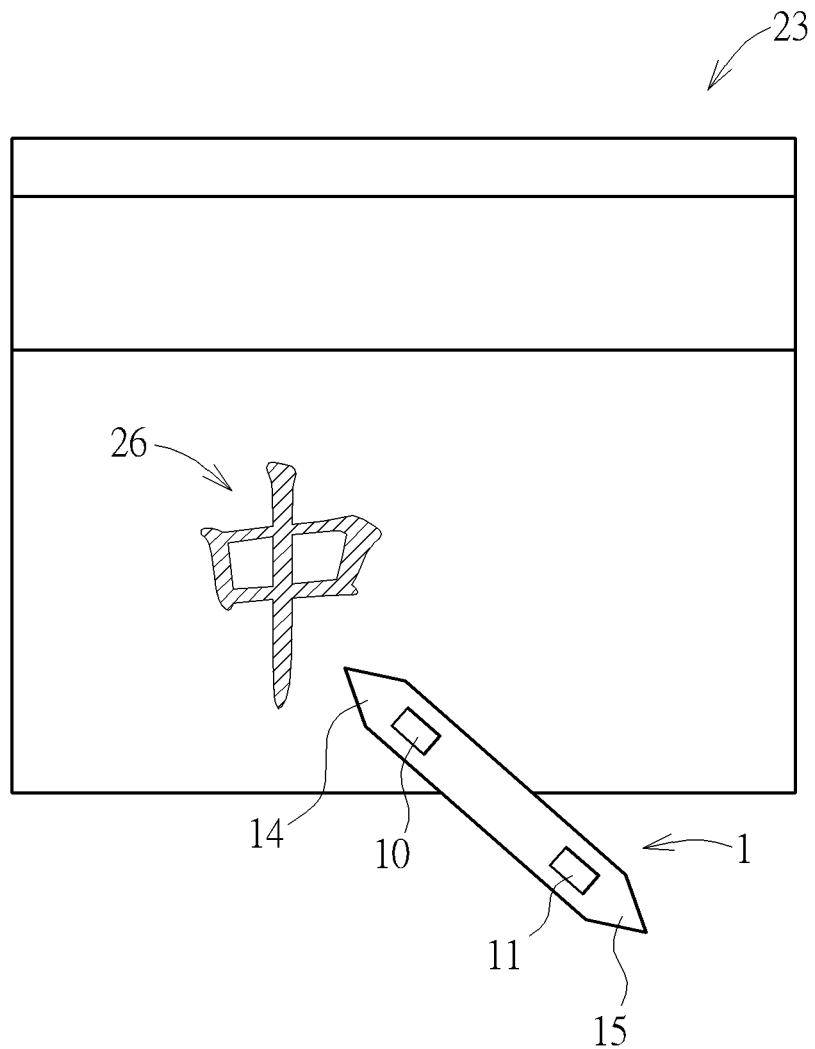
FIG. 9 is a diagram illustrating that the handheld member generates a first handwriting mode within the window according to another embodiment of the present invention.
Figure 10:
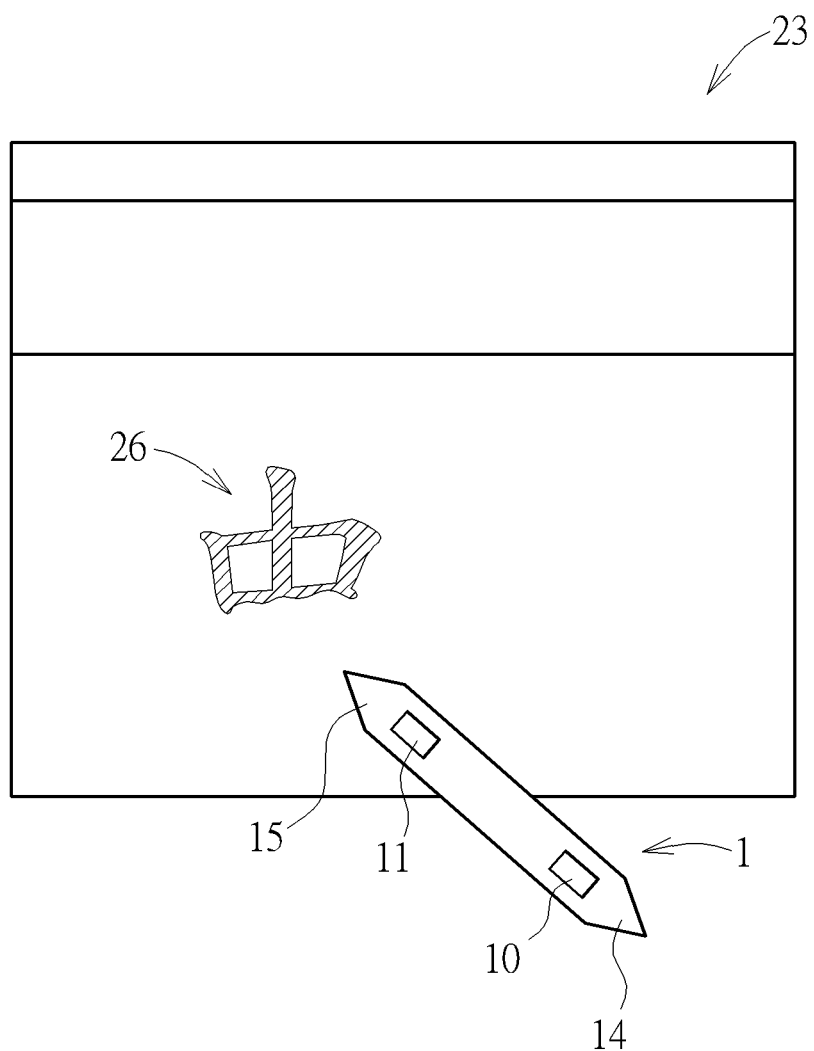
FIG. 10 is a diagram illustrating that the handheld member generates a second handwriting mode within the window according to another embodiment of the present invention.

Please refer to FIG. 9 and FIG. 10. FIG. 9 is a diagram illustrating that the handheld member 1 generates a first handwriting mode within the window 23 according to another embodiment of the present invention. FIG. 10 is a diagram illustrating that the handheld member 1 generates a second handwriting mode within the window 23 according to another embodiment of the present invention. As shown in FIG. 9 and FIG. 10, when the control unit 21 executes the first handwriting mode, the first end portion 14 of the handheld member 1 generates a handwriting 26 within the window 23 which is generated by the application program. When the control unit 21 executes the second handwriting mode, the second end portion 15 of the handheld member 1 erases the handwriting 26 within the window 23 which is generated by the application program.

It should be noticed that when the near field sensing unit 20 senses the first near field signal 12, the control unit 21 performs the first function including performing the application program and executing the first handwriting mode of the application program. In other words, when the control unit 21 does not perform the application program and the handheld member 1 with the first near filed communication tag 10 approaches the display module 2 until the near field sensing unit 20 senses the first near field signal 12, the control unit 21 performs the application program and executes the first handwriting mode of the application program simultaneously. Similarly, when the near field sensing unit 20 senses the second near field signal 13, the control unit 21 performs the second function including performing the application program and executing the second handwriting mode of the application program. In other words, when the control unit 21 does not perform the application program and the handheld member 1 with the second near field communication tag 11 approaches the display module 2 until the near field sensing unit 20 senses the second near field signal 13, the control unit 21 performs the application program and executes the second handwriting mode of the application program simultaneously.

In addition, as shown in FIG. 1, the first near filed communication tag 10 is spaced from the second near field communication tag 11 by a distance D. Accordingly, when the near field sensing unit 20 senses the first near field signal 12, the second near field signal 13 generated by the second near field communication tag 11 will not affect the near field sensing unit 20. Alternatively, when the near field sensing unit 20 senses the second near field signal 13, the first near field signal 12 generated by the first near filed communication tag 10 will not affect the near field sensing unit 20 either. It ensures that the interactive system 1000 is able to correctly execute the first handwriting mode or the second handwriting mode corresponding to the first near filed communication tag 10 or the second near field communication tag 11, respectively.

Figure 11:
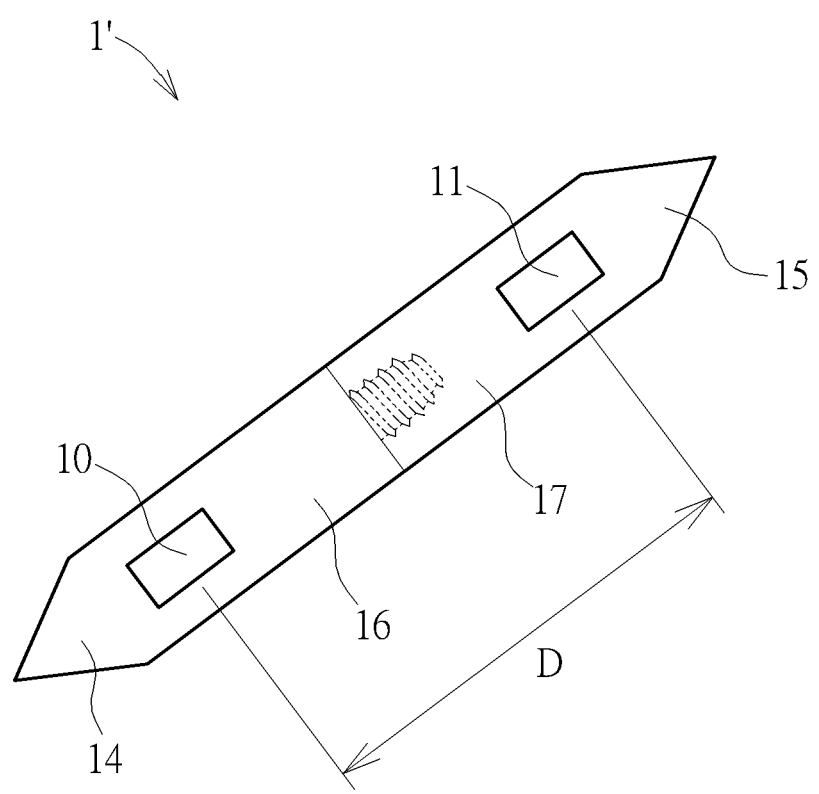
FIG. 11 is a diagram of a handheld member according to another embodiment of the present invention.

Please refer to FIG. 11. FIG. 11 is a diagram of a handheld member 1' according to another embodiment of the present invention. As shown in FIG. 11, the main difference between the handheld member 1' and the aforesaid handheld member 1 is that the handheld member 1' is a pen-shaped member having a first pen-shaped body 16 and a second pen-shaped body 17, and the first pen-shaped body 16 is detachably installed with the second pen-shaped body 17. In this embodiment, the first pen-shaped body 16 is screwed onto the second pen-shaped body 17, but the present invention is not limited thereto. It should be noticed that the first near filed communication tag 10 and the second near field communication tag 11 of the handheld member 1' has the distance D spaced therebetween, so as to ensure that the interactive system is able to correctly execute the first handwriting mode or the second handwriting mode corresponding to the first near filed communication tag 10 or the second near field communication tag 11, respectively. Components with denoted in this embodiment identical to those in the aforesaid embodiment have identical structures and functions, and further description is omitted herein for simplicity.

Figure 12:
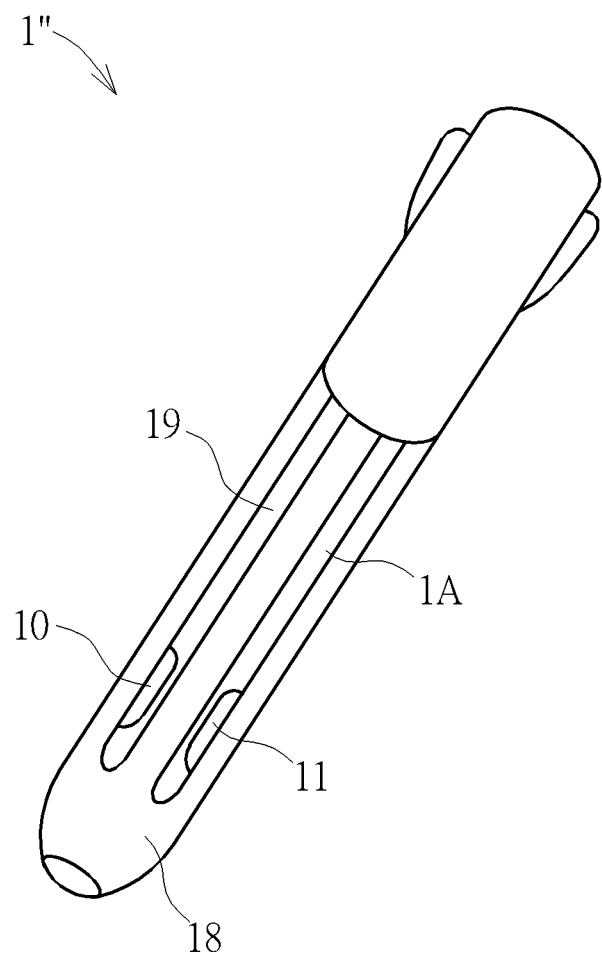
FIG. 12 is a diagram of a handheld member according to another embodiment of the present invention.

Please refer to FIG. 12. FIG. 12 is a diagram of a handheld member 1" according to another embodiment of the present invention. As shown in FIG. 12, the main difference between the handheld member 1" and the aforesaid handheld member 1 is that the handheld member 1" is a pen-shaped member which includes a sleeve 18, a first pen member 19 and a second pen member 1A. The first pen member 19 is retractably disposed in the sleeve 18, and the first near field communication tag 10 is coupled with the first pen member 19. The second pen member 1A is retractably disposed in the sleeve 18, and the second near field communication tag 11 is coupled with the second pen member 1A. Accordingly, the first pen member 19 is selectively stretched out of the sleeve 18, such that the first near field communication tag 10 is exposed out of the sleeve 18 for performing the first function. Or alternatively, the second pen member 1A is selectively stretched out of the sleeve 18, such that the second near field communication tag 11 is exposed out of the sleeve 18 for performing the second function. It should be noticed that the first near field communication tag 10 and the second near field communication tag 11 are spaced from each other by the distance therebetween either when the first pen member 19 of the handheld member 1" stretches out of the sleeve 18 or when the second pen member 1A of the handheld member 1" stretches out of the sleeve 18. Components with denoted in this embodiment identical to those in the aforesaid embodiment have identical structures and functions, and further description is omitted herein for simplicity.

Compared to the prior art, the handheld member of the present invention has the first near field communication tag generating the first near field signal and the second near field communication tag generating the second near field signal, and the display module has the near field sensing unit for sensing the first near field signal or the second near field signal. When the handheld member with the first near field communication tag approaches the near field sensing unit of the display module, the control unit of the display module performs the first function, such as executing the first handwriting mode of the application program. When the handheld member with the second near field communication tag approaches the near field sensing unit of the display module, the control unit of the display module performs the second function, such as executing the second handwriting mode of the application program. In such a manner, the present invention utilizes the handheld member with different near field communication tags to activate different handwriting modes of the display module, so as to enhance convenience of the interactive system in operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interactive system capable of switching different writing modes, comprising:
   a handheld member comprising a first near field communication tag and a second near field communication tag, the first near field communication tag generating a first near field signal, the second near field communication tag generating a second near field signal; and
   a display module comprising:
      a touch control user interface;
      a bezel surrounding the touch control user interface;
      a near field sensing unit disposed on the bezel and separated from the touch control user interface for sensing the first near field signal or the second near field signal; and
      a control unit coupled to the near field sensing unit, the control unit controlling the touch control user interface to perform a first function when the near field sensing unit senses the first near field signal, and the control unit further controlling the touch control user interface to perform a second function when the near field sensing unit senses the second near field signal.

2. The interactive system of claim 1, wherein the control unit further performs an application program, the control unit performs the first function executing a first writing mode of the application program when the near field sensing unit senses the first near field signal, and the control unit performs the second function executing a second writing mode of the application program when the near field sensing unit senses the second near field signal.

3. The interactive system of claim 2, wherein the handheld member is a pen-shaped member, the pen-shaped member generates a first handwriting within a window which is generated by the application program when the control unit executes the first writing mode, and the pen-shaped member generates a second handwriting within the window which is generated by the application program when the control unit executes the second writing mode.

4. The interactive system of claim 3, wherein a color of the first handwriting is different from a color of the second handwriting.

5. The interactive system of claim 3, wherein a width of the first handwriting is greater than a width of the second handwriting.

6. The interactive system of claim 3, wherein the first handwriting is in writing brush font, and the second handwriting is in highlighter font.

7. The interactive system of claim 2, wherein the handheld member is a pen-shaped member, the pen-shaped member has a first end portion and a second end portion, the first near field communication tag is coupled with the first end portion, the second near field communication tag is coupled with the second end portion, the first end portion generates a handwriting within a window which is generated by the application program when the control unit executes the first writing mode, and the second end portion erases the handwriting within the window which is generated by the application program when the control unit executes the second writing mode.

8. The interactive system of claim 1, wherein the control unit performs the first function including performing an application program and executing a first writing mode of the application program when the near field sensing unit senses the first near field signal, and the control unit performs the second function including performing the application program and executing a second writing mode of the application program when the near field sensing unit senses the second near field signal.

9. The interactive system of claim 1, wherein the handheld member is a pen-shaped member, the pen-shaped member has a first end portion and a second end portion, the first near field communication tag is coupled with the first end portion, and the second near field communication tag is coupled with the second end portion.

10. The interactive system of claim 1, wherein the handheld member is a pen-shaped member, the pen-shaped member has a first pen-shaped body and a second pen-shaped body, the first pen-shaped body is detachably installed with the second pen-shaped body, the first pen-shaped body has a first end portion, the first near field communication tag is coupled with the first end portion, the second pen-shaped body has a second end portion, and the second near field communication tag is coupled with the second end portion.

11. The interactive system of claim 1, wherein the handheld member is a pen-shaped member, and the pen-shaped member comprises:
   a sleeve;
   a first pen member retractably disposed in the sleeve, the first near field communication tag is coupled with the first pen member; and
   a second pen member retractably disposed in the sleeve, the second near field communication tag is coupled with the second pen member.

12. The interactive system of claim 1, wherein the first near field communication tag is spaced from the second near field communication tag by a distance.

* * * * *